Figure 1:
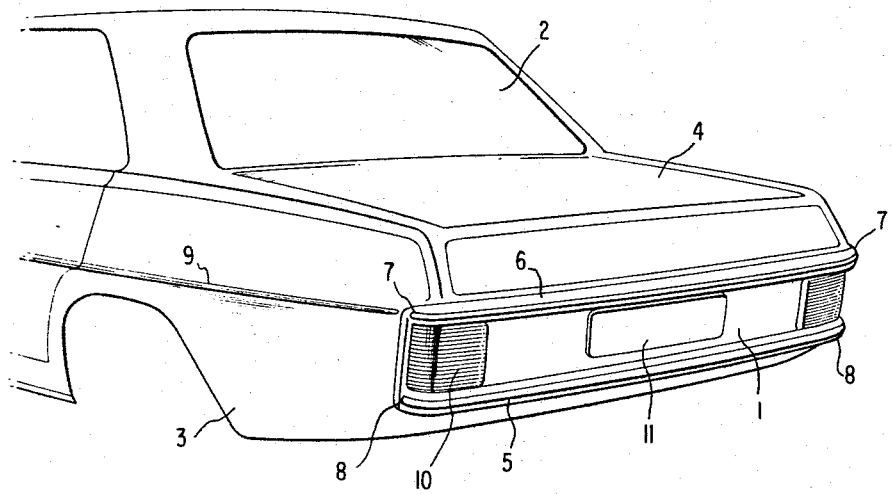

June 20, 1967 K. WILFERT 3,326,590

INTEGRAL BUMPER CONSTRUCTION

Filed Dec. 23, 1965

INVENTOR

KARL WILFERT

BY Dicke & Craig

ATTORNEYS

United States Patent Office 3,326,590
Patented June 20, 1967

3,326,590
INTEGRAL BUMPER CONSTRUCTION
Karl Wilfert, Gerlingen-Waldstadt, Germany, assignor to Daimler-Benz Aktiengesellschaft, Stuttgart-Unterturkheim, Germany
Filed Dec. 23, 1965, Ser. No. 515,992
Claims priority, application Germany, Dec. 24, 1964, D 46,140
4 Claims. (Cl. 293—81)

The present invention relates to a body end part in motor vehicles having a bumper which is arranged horizontally at the end face transversely to the vehicle, especially for passenger motor vehicles.

The known bumpers in motor vehicles consist in general of bumper bars arranged transversely in front of the front or the rear end of the vehicle, which may be, for example, chrome-plated and are bent at the ends thereof in the direction toward the lateral surfaces of the vehicle so that they provide additionally also a protection at the corners of the vehicle. Such type of bumpers entail the disadvantage that they are rather costly in the manufacture thereof and nevertheless are unable to absorb any larger impact forces. Additionally, these bumpers are dented or bent with relatively light impacts and therefore have to be exchanged in numerous cases. Furthermore, the known bumper bars offer only insufficient protection against damage to the light units, for example, the rear lights or the head lights; the safe further use of the vehicle can therefore be put into jeopardy even after relatively smaller collisions.

Bumpers have also become known in the prior art which, for purposes of avoiding any damage, are provided in certain places of the bumper bar with installed rubber sectional or profile members which are able to absorb lighter impacts, for example, during parking or the like. These prior art bumper bars, however, also exhibit the same disadvantage in that they are costly in the manufacture thereof and do not offer sufficient protection for the light units.

The underlying aim of the present invention is to avoid the aforementioned disadvantages. The present invention essentially consists in that the bumper, constructed as head piece or end piece, is provided with two parallely extending impact bars arranged at a distance one above the other. These impact bars are formed as separate, U-shaped protuberances extending across the top and bottom of the laterally-extending backing plate. In this manner it is possible, inter alia, to considerably and significantly simplify the manufacture of the bumper parts and to achieve a sufficient protection against impacts. Advantageously, the head piece or end piece may be constructed in cross section approximately in the manner of a U-shaped profile or sectional member. A particularly sturdy head piece or end piece, which is extremely simple in construction results from such an arrangement and construction.

Additionally, the bumper assembly may slightly overlap laterally the end face of the vehicle so that the body of the vehicle is also protected against impacts which take place obliquely from the front or from the rear side thereof.

Provision may be made in one particularly advantageous construction that the upper impact bar does not project as far out of the plane of the backing plate or web portion of the bumper assembly as the lower impact bar so that in case of a collision of two vehicles, the two impact bars become effective sequentially whereby the deformation work can be absorbed in a particularly favorable manner.

The distance of the two impact bars from each other may correspond advantageously approximately to the dimension in height of the individual or combined light units arranged therebetween. The head piece or end piece constructed as bumper or impact protection means may then form a unit, for example, inclusive the rear lights, the turn indicator lights and/or stop lights as well as a securing means for the mounting of the vehicle license plate, which unit effectively prevents damage to the light units from small collisions since the light units are embedded in the backing plate between the impact bars. Apart therefrom, a closed terminal piece of the motor vehicle is created thereby which is not provided with any projections or sharp edges on which might occur injuries or damages.

The impact bars may be rounded off in a favorable manner at the ends within the transition to the lateral surfaces of the motor vehicle and the upper impact bar may adjoin with its ends a lateral skirting or protective strip of the vehicle. For purposes of not only achieving a good external appearance and impression but also for purposes of rounding off the outer contours of the vehicle and for avoiding injuries of persons or damages of other vehicles, the head piece or end piece in accordance with the present invention may be advantageously embedded with its rear side in a recess of the vehicle body end part.

Accordingly, it is an object of the present invention to provide a bumper for motor vehicles which obviates the aforementioned shortcomings and drawbacks encountered in the prior art by extremely simple means.

Another objection of the present invention resides in a bumper for motor vehicles, particularly for passenger motor vehicles, which may be manufactured in a relatively inexpensive manner yet assures adequate protection of the vehicle parts.

A further object of the present invention resides in a bumper for motor vehicles which is capable of absorbing relatively larger impact forces without requiring exchange thereof as a result of minor collisions that would normally cause indenting and bending of the currently used bumpers.

Still another object of the present invention resides in a bumper of the aforementioned type which also affords sufficient protection to the light units as well as protection against oblique impacts directed against the corners of the vehicle.

A still further object of the present invention resides in a bumper for motor vehicles which absorbs in a particularly favorable manner the deformation work in case of collision.

Another object of the present invention resides in a bumper structure which constitutes a unitary subassembly devoid of any protections or sharp edges that might lead to injuries or damages.

Still another object of the present invention resides in a bumper for passenger motor vehicles which not only achieves all of the aforementioned aims and objects in an extremely effective manner but additionally contributes greatly to the aesthetic appearance of the external configuration of the vehicle.

Figure 2:
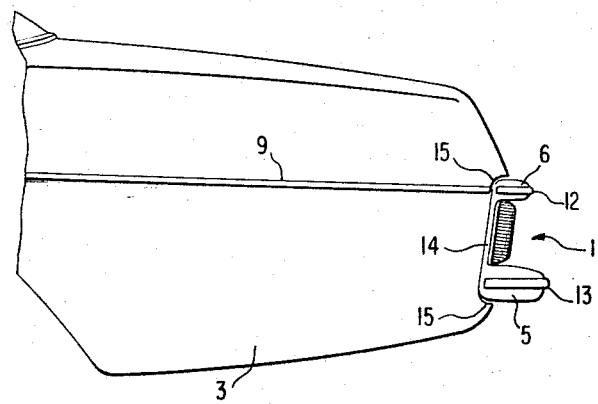

These and further objects, features and advantages of the present invention will become more obvious from the following description when taken in connection with the accompanying drawing which shows, for purposes of illustration only, one embodiment in accordance with the present invention, wherein FIGURE 1 is a perspective view of a motor vehicle rear part provided with a head piece or end piece in accordance with the present invention, and FIGURE 2 is a partial lateral elevational view of the vehicle body end portion of FIGURE 1.

Referring now to the drawing wherein like reference numerals are used throughout the two views to designate like parts, reference numeral 1 generally designates in both figures a body end piece arranged at the rear end of a motor vehicle. Only the rear window 2 together with the adjoining luggage space lid 4 and the rear wheel fender 3 can be seen of the vehicle in the drawing. The portion of the bumper assembly 1 between the impact bars 5 and 6 is a backing plate from which the impact bars 5 and 6 are formed as projections thereupon. The bumper assembly 1 is provided with two parallel impact bars 5 and 6 which delimit the bumper assembly 1 in the upward and downward directions. The impact bars 5 and 6 are rounded off at the ends 7 and 8, respectively, and project laterally at the ends of the vehicle over the lateral body panels adjoining the fenders 3 so that the bumper assembly 1 laterally overlaps the rear of the vehicle. The ends 7 of the upper impact bar 6 thereby adjoin lateral protective strips 9 so that an anti-scratch protection extending completely about the vehicle results therefrom. Individual or combined light units 10 are arranged between the parallel impact bars 5 and 6 which light units, in the illustrated embodiments correspond in their height exactly to the distance between the two impact bars 5 and 6. In this manner the light units 10 are embedded between the bars 5 and 6 and are protected against damage in an advantageous manner. A mounting means 11 of conventional construction is accommodated in the center of the bumper assembly 1 for the mounting of the vehicle license plate.

As can be readily seen from FIGURE 2, the lower impact bar 5 projects a greater distance out of the plane of the bumper assembly 1 than the upper impact bar 6. Both impact bars 5 and 6 may be equipped additionally with protective strips 12 and 13 whereby either both strips may be made of elastic material or only the strip 13 consists of rubber or the like whereas the strip 12 adjoining the strip 9 is made of the same material and in the same manner as the strip 9.

The entire bumper assembly 1 is installed into a recess or indentation 14 provided at the rear part of the motor vehicle whereby the corners 15 of the recess 14 are constructed with rounded off surfaces. The bumper assembly 1 is surrounded in the recess 14 only by the sheet metal vehicle body panels but is anchored to the frame of the motor vehicle in any suitable manner (not shown). As can also be clearly seen from FIGURE 2, owing to the arrangement of the two impact bars 5 and 6, the bumper assembly 1 is constructed in cross section approximately in the manner of a U-shaped sectional piece and receives thereby a great rigidity.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intended to cover all such changes and modifications as are encompassed by the scope of the appended claims.

I claim:

1. A unitary bumper assembly for a motor vehicle body having a recess extending substantially across the entire width of the end portion thereof, comprising a backing plate which extends substantially across the entire width of the motor vehicle, and two superposed impact bars spaced vertically from each other protruding from said backing plate and coextensive with said backing plate substantially over the entire length thereof, said backing plate constituting a web portion between said impact bars and adapted to receive light units therein.

2. A bumper assembly according to claim 1, wherein the lower of said two superposed impact bars protrudes farther from said backing plate than the upper of said two superposed impact bars.

3. A bumper assembly according to claim 1, wherein said assembly extends slightly beyond the sides of said motor vehicle body and said upper impact bar is aligned with horizontal protective strips which are affixed to the sides of said vehicle body.

4. A bumper assembly according to claim 3, wherein said two superposed impact bars are provided with protective strips of elastic material extending along the outermost edge of said impact bars.

References Cited

UNITED STATES PATENTS

| | | | |
|---|---|---|---|
| 1,383,515 | 7/1921 | Baumgartl | 293—98 |
| 2,062,315 | 12/1936 | Jandus et al. | 293—97 X |
| 2,161,837 | 6/1939 | Tell | 280—152 |
| 2,193,229 | 3/1940 | Exner | 293—63 |
| 2,194,042 | 3/1940 | Wyatt | 293—69 X |
| 2,231,313 | 2/1941 | Ache | 293—69 |
| 2,633,379 | 3/1953 | Kraeft | 293—63 X |
| 2,829,915 | 4/1958 | Claveau | 296—63 X |
| 2,905,286 | 9/1959 | Adams et al. | 293—78 X |

ARTHUR L. LA POINT, *Primary Examiner.*

H. BELTRAN, *Assistant Examiner.*